(12) United States Patent
Anderson et al.

(10) Patent No.: US 10,883,413 B2
(45) Date of Patent: Jan. 5, 2021

(54) PRE-CHAMBER ASSEMBLY

(71) Applicant: CUMMINS INC., Columbus, IN (US)

(72) Inventors: Alan C. Anderson, Columbus, IN (US); John R. Andras, Plain City, OH (US)

(73) Assignee: Cummins Inc., Columbus, IN (US)

( * ) Notice: Subject to any disclaimer, the term of this patent is extended or adjusted under 35 U.S.C. 154(b) by 287 days.

(21) Appl. No.: 15/759,045

(22) PCT Filed: Oct. 8, 2015

(86) PCT No.: PCT/US2015/054592
§ 371 (c)(1),
(2) Date: Mar. 9, 2018

(87) PCT Pub. No.: WO2017/062003
PCT Pub. Date: Apr. 13, 2017

(65) Prior Publication Data
US 2020/0123963 A1    Apr. 23, 2020

(51) Int. Cl.
| F02B 19/10 | (2006.01) |
| F02B 19/12 | (2006.01) |
| F02B 19/18 | (2006.01) |
| F02D 41/00 | (2006.01) |
| F02F 3/26  | (2006.01) |

(52) U.S. Cl.
CPC ........ F02B 19/1014 (2013.01); F02B 19/108 (2013.01); F02B 19/1009 (2013.01); F02B 19/1023 (2013.01); F02B 19/12 (2013.01); F02B 19/18 (2013.01); F02D 41/009 (2013.01); F02F 3/26 (2013.01); F02D 2200/024 (2013.01)

(58) Field of Classification Search
CPC .. F02B 19/1014; F02B 19/1023; F02B 19/18; F02B 19/12; F02B 19/108; F02B 19/1009; F02D 41/009; F02D 2200/024; F02F 3/26
See application file for complete search history.

(56) References Cited

U.S. PATENT DOCUMENTS

| 3,508,530 A * | 4/1970 | Clawson ............. F02B 19/1014 |
| | | 123/275 |
| 4,270,498 A * | 6/1981 | Occella ................... F02B 19/12 |
| | | 123/276 |
| 4,306,526 A | 12/1981 | Schaub et al. |
| 5,024,193 A | 6/1991 | Graze, Jr. |

(Continued)

FOREIGN PATENT DOCUMENTS

| DE | 10 2014 004943 | 2/2015 |
| DE | 102014004943 A1 | 2/2019 |

(Continued)

OTHER PUBLICATIONS

International Search Report and Written Opinion dated Jan. 12, 2016 in PCT/US2015/054592.

(Continued)

*Primary Examiner* — Joseph J Dallo
(74) *Attorney, Agent, or Firm* — Faegre Drinker Biddle & Reath LLP (57) ABSTRACT

A pre-chamber assembly of an internal combustion engine comprises a pre-chamber housing and a plurality of nozzles extending through a portion of the pre-chamber housing. The plurality of nozzles are directed to one location.

21 Claims, 7 Drawing Sheets

(56) References Cited

U.S. PATENT DOCUMENTS

| | | | |
|---|---|---|---|
| 5,555,868 A | 9/1996 | Neumann | |
| 5,947,076 A * | 9/1999 | Srinivasan | F02B 19/12 |
| | | | 123/256 |
| 6,854,439 B2 | 2/2005 | Regueiro | |
| 7,216,623 B2 | 5/2007 | Teraji et al. | |
| 7,438,043 B2 | 10/2008 | Shiraishi et al. | |
| 7,950,364 B2 | 5/2011 | Nerheim | |
| 8,839,762 B1 * | 9/2014 | Chiera | F02B 19/108 |
| | | | 123/256 |
| 8,925,518 B1 | 1/2015 | Riley et al. | |
| 9,964,023 B1 * | 5/2018 | Teslovich | F02B 19/12 |
| 10,125,676 B2 * | 11/2018 | Thomassin | F02B 53/10 |
| 10,557,407 B2 * | 2/2020 | Dussault | F02B 19/12 |
| 2005/0247283 A1 | 11/2005 | Lampard | |
| 2011/0005478 A1 | 1/2011 | Taliaferro | |
| 2012/0090572 A1 * | 4/2012 | Baxter | F02B 23/0621 |
| | | | 123/193.6 |
| 2012/0125287 A1 | 5/2012 | Chiera et al. | |
| 2013/0000598 A1 | 1/2013 | Tokuota et al. | |
| 2013/0206122 A1 | 8/2013 | Chiera et al. | |
| 2014/0196686 A1 * | 7/2014 | Coldren | F02B 19/12 |
| | | | 123/299 |
| 2014/0261296 A1 | 9/2014 | Sotiropoulou et al. | |
| 2015/0184578 A1 | 7/2015 | Oda et al. | |
| 2017/0030315 A1 * | 2/2017 | Bauer | F02M 61/1806 |
| 2017/0096932 A1 * | 4/2017 | Chiera | F02B 19/18 |
| 2017/0101922 A1 * | 4/2017 | Loetz | F02B 19/08 |

FOREIGN PATENT DOCUMENTS

| | | |
|---|---|---|
| EP | 2 700 796 | 2/2014 |
| FR | 2 886 689 | 12/2006 |
| FR | 2886689 A1 | 12/2006 |
| GB | 201207 | 7/1923 |
| JP | 2003-278548 | 10/2003 |
| JP | 2007-040174 | 2/2007 |
| JP | 5451490 | 3/2014 |
| WO | 98/45588 | 10/1995 |

OTHER PUBLICATIONS

European Search Report and Search Opinion Received for EP Application No. 15905945.0, dated Feb. 15, 2019, 8 pages.

Letter Exam Report issued by the China National Intellectual Property Administration, dated Feb. 3, 2020, Chinese language, for Chinese Application No. 201580883633.6; 11 pages.

Letter Exam Report issued by the China National Intellectual Property Administration, dated Feb. 3, 2020, translated to English language, for Chinese Application No. 201580883633.6; 12 pages.

International Preliminary Report on Patentability dated Apr. 13, 2018 in PCT/US2015/054592.

Extended European Search Report dated Feb. 15, 2019 in corresponding EP Application No. 15905945.0.

* cited by examiner

PRE-CHAMBER ASSEMBLY

CROSS-REFERENCE TO RELATED APPLICATIONS

The present application is a national stage application of International (PCT) Patent Application Serial No. PCT/US2015/054592, filed on Oct. 8, 2015, the complete disclosure of which is expressly incorporated by reference herein.

TECHNICAL FIELD OF THE DISCLOSURE

The present disclosure relates to a pre-chamber assembly of an internal combustion engine and, more particularly, to a pre-chamber assembly having a plurality of nozzles directed to one location in a piston bowl of a piston of the internal combustion engine.

BACKGROUND OF THE DISCLOSURE

An internal combustion engine may include both a main chamber and a pre-chamber or antechamber. The main chamber includes a piston configured to reciprocate during a combustion cycle. The pre-chamber is positioned above the main chamber and within the cylinder head of the engine. The pre-chamber may include a spark plug such that combustion may be initiated in the pre-chamber rather than the main chamber. Because there is lower turbulence of the air and/or fuel within the pre-chamber relative to the main chamber at the time of ignition, initiating combustion in the pre-chamber, rather than the main chamber, may allow for consistent initial flame kernel growth which may lead to more efficient combustion.

Various types of pre-chambers may be provided within the cylinder head, including a passive pre-chamber, a charge-fed pre-chamber, and a fuel-fed pre-chamber. A passive pre-chamber assembly does not directly receive any air and/or fuel, but rather, receives air and/or fuel from the main chamber during the compression stroke of the piston. A fuel-fed pre-chamber assembly receives raw fuel directly into the pre-chamber assembly during a combustion cycle. A charge-fed pre-chamber assembly receives a charge of air and fuel directly into the pre-chamber assembly during a combustion cycle. Any of the pre-chambers may be in the form a spray-nozzle pre-chamber, which include a plurality of nozzles each directed to a different location within the main chamber.

Spray nozzle-type pre-chambers may result in incomplete combustion because the outlet jets expelled from the pre-chamber during combustion may not mix thoroughly with the charge in the main chamber. More particularly, because the spray nozzle-type pre-chamber focuses a plurality of individual outlet jets at different locations within the main chamber, the outlet jets form a plurality of small ignition sites, rather than a single, large ignition site, which may contribute to poor ignition in the main chamber. Therefore, a need exists for a pre-chamber configured to increase ignition within the main chamber.

SUMMARY OF THE DISCLOSURE

In one embodiment of the present disclosure, a pre-chamber assembly of an internal combustion engine comprises a pre-chamber housing and a plurality of nozzles extending through a portion of the pre-chamber housing. The plurality of nozzles are directed to one location.

In one aspect of the pre-chamber assembly, an output from each nozzle is configured to converge at the one location at a predetermined operation of the engine.

In a further aspect of the pre-chamber assembly, the predetermined operation of the engine is selected from the group consisting of a position of a piston within a combustion chamber of the engine, a position of a crankshaft of the engine, a pressure in the pre-chamber housing, and a pressure in a main chamber of the engine.

In another aspect of the pre-chamber assembly, the pre-chamber assembly is a passive pre-chamber assembly.

In another aspect of the pre-chamber assembly, the pre-chamber assembly is a fuel-fed pre-chamber assembly.

In another aspect of the pre-chamber assembly, the pre-chamber assembly is a charge-fed pre-chamber assembly.

In a further aspect of the pre-chamber assembly, the output from each nozzle converges toward a center portion of a combustion chamber of the internal combustion engine.

In another aspect of the pre-chamber assembly, each nozzle is configured to receive a flow of charge from the combustion chamber, and a velocity of the flow of charge is less than 110 msec.

In one aspect of the pre-chamber assembly, the velocity of the flow of charge is less than 90 msec.

In another aspect of the pre-chamber assembly, the pre-chamber housing has a first diameter and each nozzle has a second diameter, and the ratio of the first diameter to the second diameter is 3.0-6.0.

In one variant of the pre-chamber assembly, the ratio of the first diameter to the second diameter is 3.4-5.0.

In another embodiment of the present disclosure, an internal combustion engine comprises at least one cylinder including a main chamber and a pre-chamber fluidly coupled to the main chamber, a plurality of nozzles fluidly coupling the pre-chamber and the main chamber, and a piston positioned in the main chamber and including a piston bowl facing the pre-chamber. An output from each of the nozzles is configured to converge within the piston bowl.

In one aspect of the internal combustion engine, the output from each nozzle converges at a center portion of the piston bowl.

In a further aspect of the internal combustion engine, an ignition device is supported within the pre-chamber and configured to ignite a charge in the pre-chamber.

In one aspect of the internal combustion engine, the engine comprises at least one coolant flow path, and at least one of the pre-chamber and the ignition device is positioned within the coolant flow path.

In one aspect of the internal combustion engine, each nozzle is angled toward a center portion of the pre-chamber.

In one aspect of the internal combustion engine, the pre-chamber has a first diameter and each nozzle has a second diameter, and the ratio of the first diameter to the second diameter is 3.0-6.0.

In one aspect of the internal combustion engine, the ratio of the first diameter to the second diameter is 3.4-5.0.

In one aspect of the internal combustion engine, each nozzle has the same diameter.

In a further embodiment of the present disclosure, a method of initiating combustion within an internal combustion engine comprises providing a main chamber extending along a longitudinal axis, providing a pre-chamber fluidly coupled to the main chamber through a plurality of nozzles, igniting a charge in the pre-chamber, and focusing an output of the ignited charge from each nozzle toward one location within the main chamber.

In one aspect of the method, the method further comprises providing a piston with a piston bowl within the main chamber, wherein focusing the output includes focusing the output of the ignited charge from each nozzle toward a center portion of the piston bowl.

In one aspect of the method, focusing the output includes converging the output of the ignited charge from each nozzle within the piston bowl.

In one aspect of the method, the method further comprises further comprising flowing a second charge from the main chamber into the piston bowl, wherein focusing the output includes converging the output of the ignited charge from each nozzle within the piston bowl below the flow of the second charge.

Advantages and features of the embodiments of this disclosure will become more apparent from the following detailed description of exemplary embodiments when viewed in conjunction with the accompanying drawings.

DETAILED DESCRIPTION OF THE DRAWINGS

Figure 1:
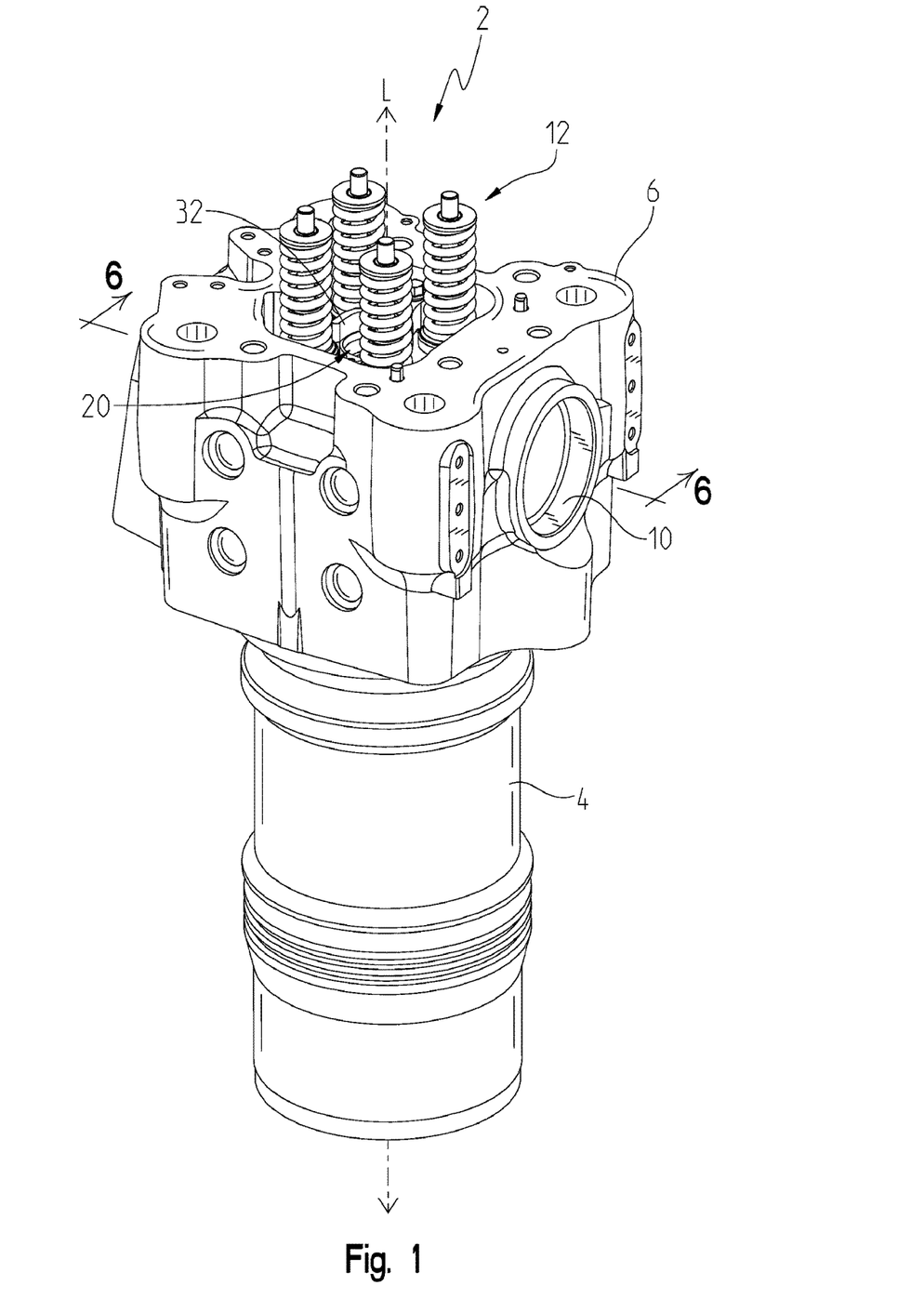
FIG. 1 is a perspective view of a cylinder assembly of an internal combustion engine of the present disclosure which includes a cylinder head coupled to a cylinder.

Referring to FIG. 1, an internal combustion engine includes a plurality of cylinder assemblies 2. Fuel may be provided to the internal combustion engine upstream of a turbocharger compressor (not shown). The fuel may be natural gas, gasoline, diesel fuel, or any other type of fuel configured for the internal combustion engine. Additionally, the internal combustion engine may be an in-line or V-type engine with any number of cylinder assemblies 2.

Each cylinder assembly 2 includes a cylinder 4 and a cylinder head 6. Cylinder head 6 is sealingly coupled to cylinder 4 with a gasket 16 (FIG. 6) positioned therebetween. Cylinder 4 extends longitudinally along a longitudinal axis L of cylinder assembly 2. A piston 8 (FIG. 6) is configured to reciprocate within a cylinder bore 5 of cylinder 4 between a top-dead-center position ("TDC") and a bottom-dead-center position ("BDC") during a combustion cycle of the internal combustion engine. Piston 8 includes a piston bowl 58, as disclosed further herein. Piston bowl 58 may be spaced apart from cylinder head 6 by a clearance or squish region 60 when piston bowl 58 is at TDC, as shown in FIG. 7. A main chamber 7 is defined as the volume within cylinder bore 5 above piston 8 and below cylinder head 6 and includes piston bowl 58.

Figure 2:
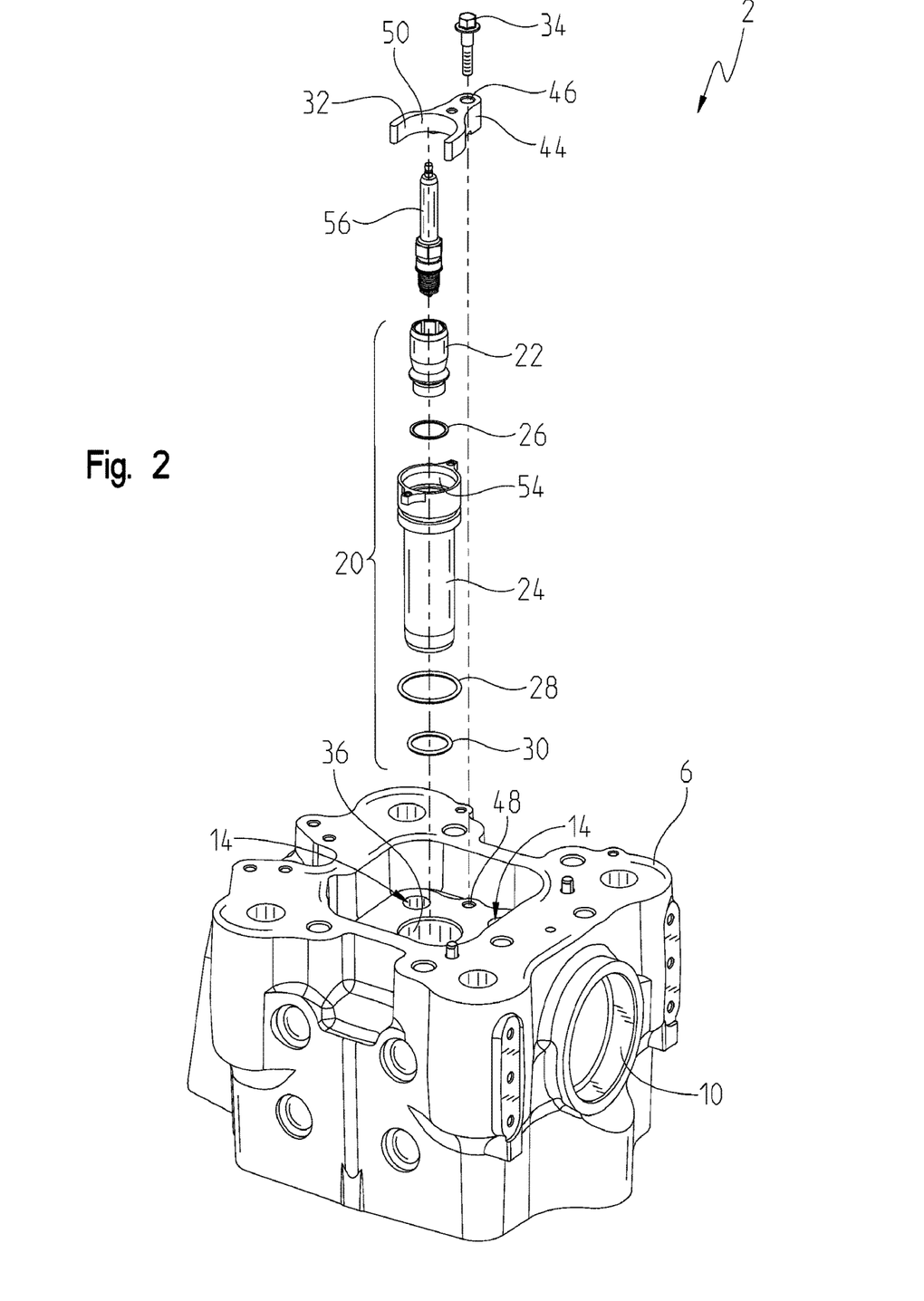
FIG. 2 is an exploded view of a pre-chamber assembly, spark plug, and the cylinder head of FIG. 1.
Figure 3:
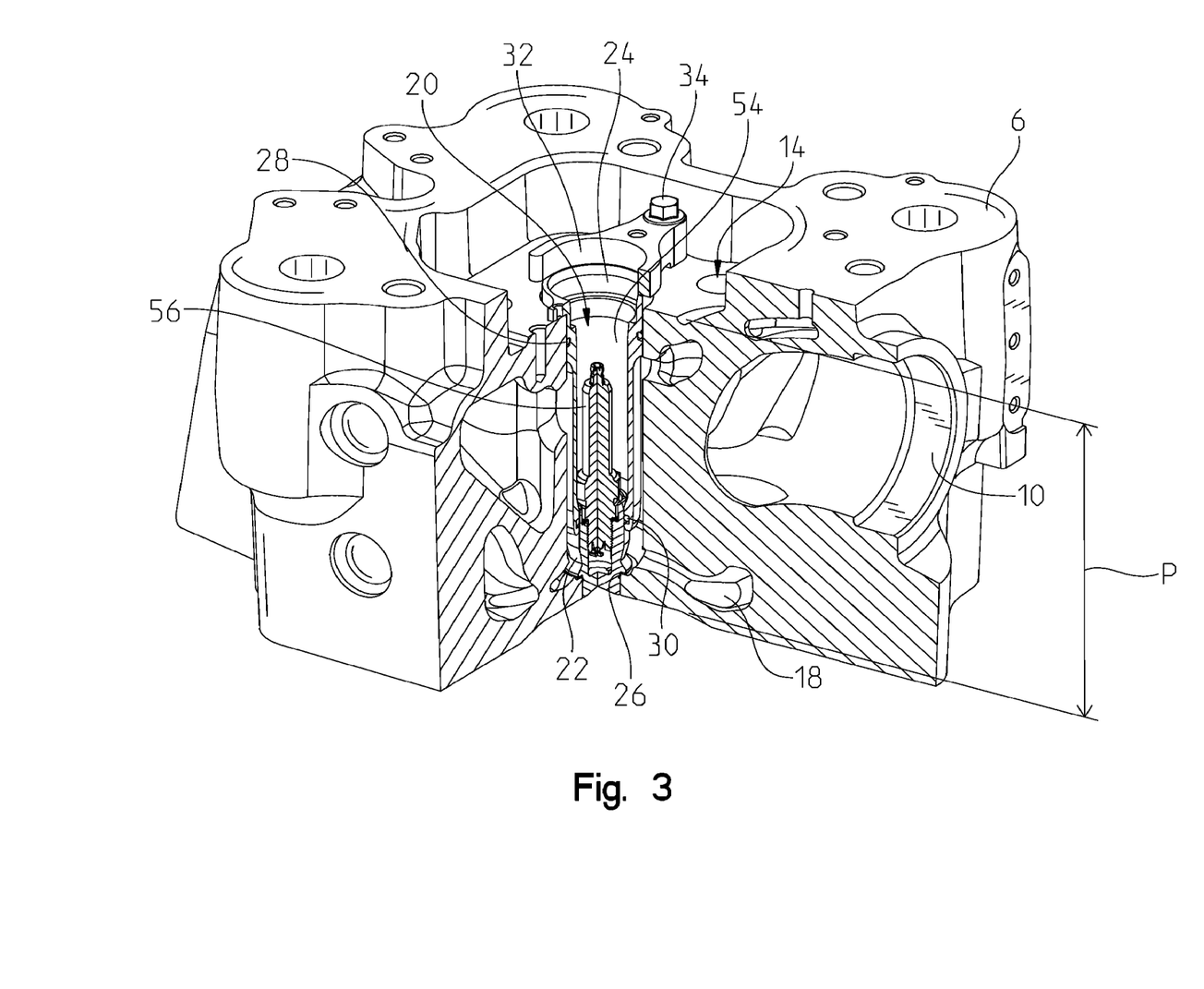
FIG. 3 is a cross-sectional view of the pre-chamber assembly, spark plug, and the cylinder head of FIG. 2.
Figure 4:
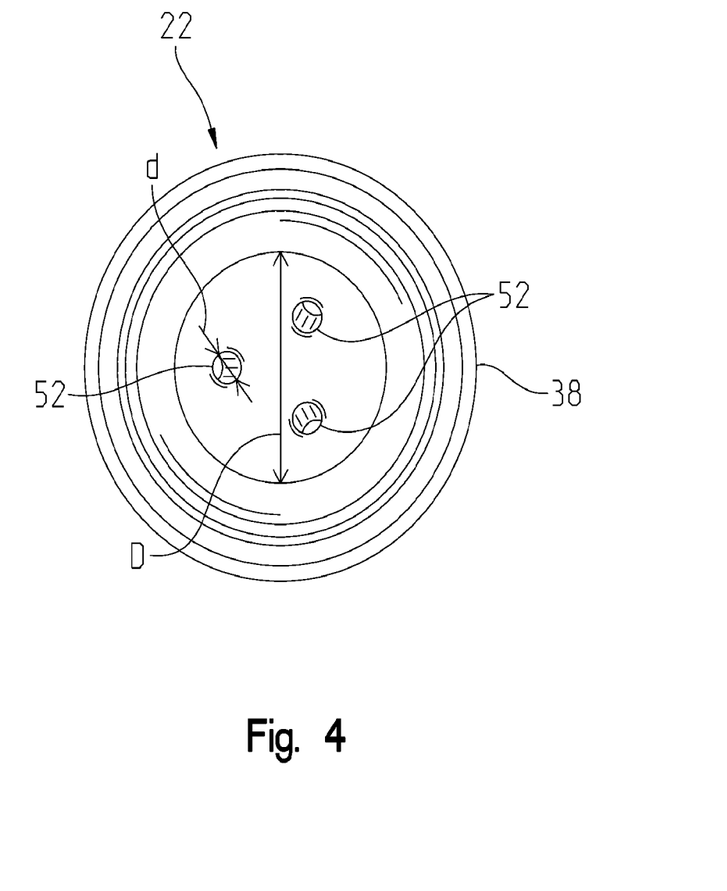
FIG. 4 is a bottom view of a housing member of the pre-chamber assembly of FIG. 2.
Figure 6:
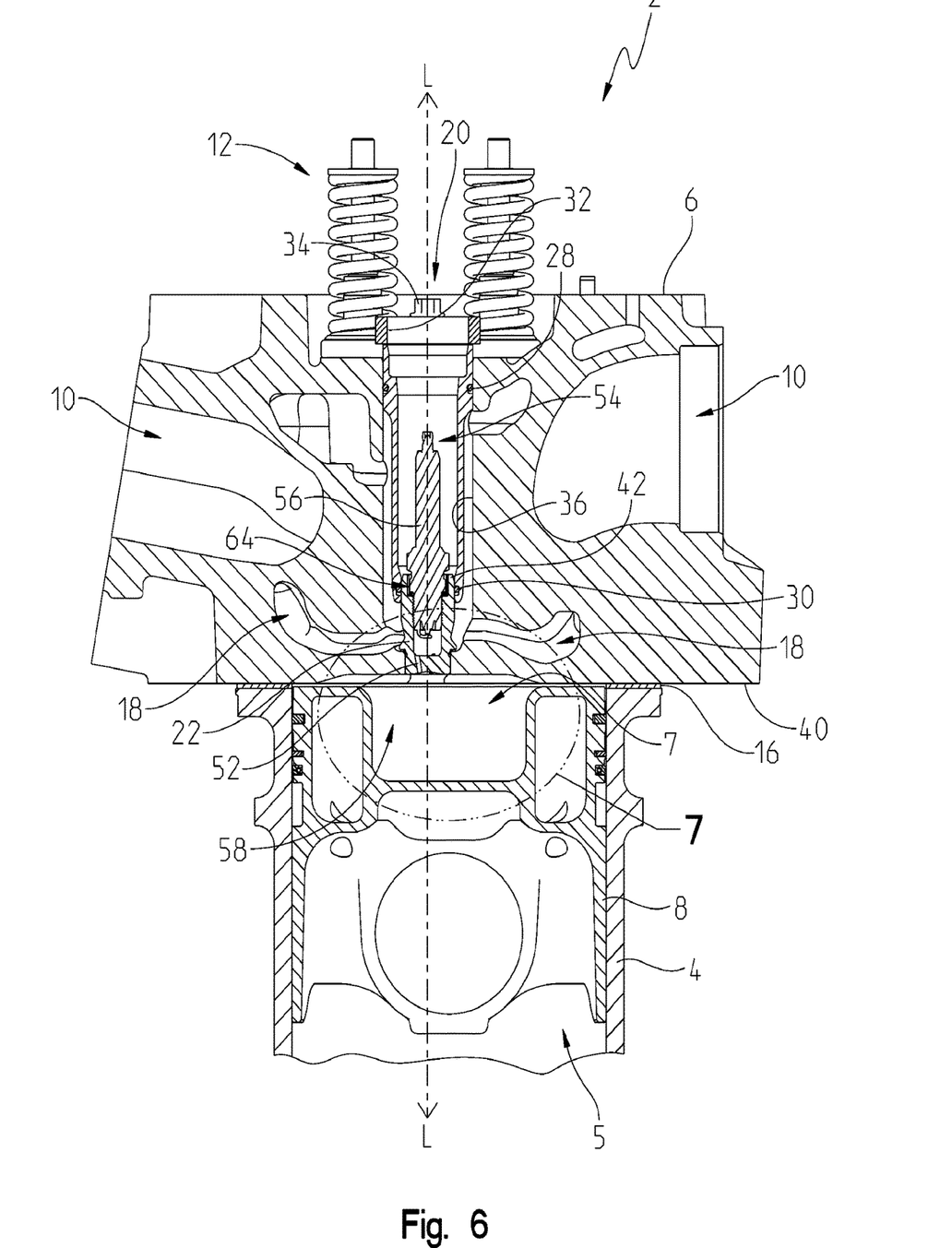
FIG. 6 is a cross-sectional view of the cylinder head and cylinder of FIG. 1, taken along line 6-6 of FIG. 1.
Figure 7:
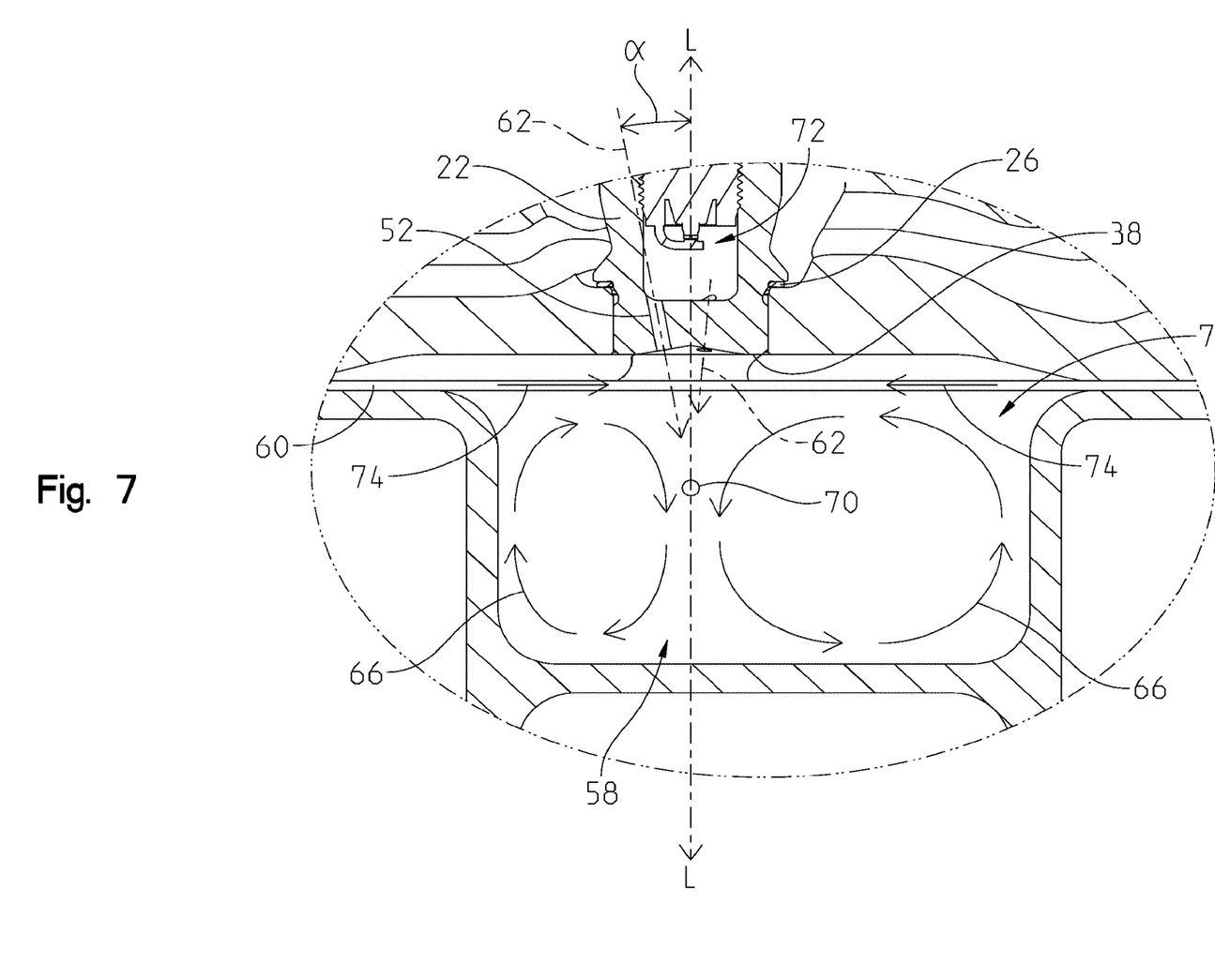
FIG. 7 is a detailed view of a portion of the cylinder head and cylinder of FIG. 6.

As shown in FIGS. 1-3 and 6, cylinder head 6 is positioned above cylinder 4 and includes a plurality of passageways 10 for receiving intake air for combustion and exhausting combustion byproducts from cylinder 4. Additionally, cylinder head 6 includes a plurality of valves 12 fluidly coupled to passageways 10. More particularly, each valve 12 is positioned within a guide 14 (FIG. 2) of cylinder head 6. Two of valves 12 allow intake air to enter cylinder 4 and two of valves 12 allow combustion byproducts to flow out of cylinder 4. Cylinder head 6 also includes at least one cooling passageway 18, as shown in FIGS. 3 and 6, configured to receive cooling fluid (e.g., air or coolant) for decreasing the temperature of cylinder head 6 and components therein during operation of the internal combustion engine.

As shown in FIGS. 2-7, cylinder head 6 also includes a pre-chamber assembly 20 positioned within a cylindrical channel 36 of cylinder head 6. Illustratively, channel 36 and, therefore, pre-chamber assembly 20 is positioned intermediate valves 12. In one embodiment, pre-chamber assembly 20 may be a passive pre-chamber assembly, a fuel-fed pre-chamber assembly, or a charge-fed pre-chamber assembly.

Figure 5:
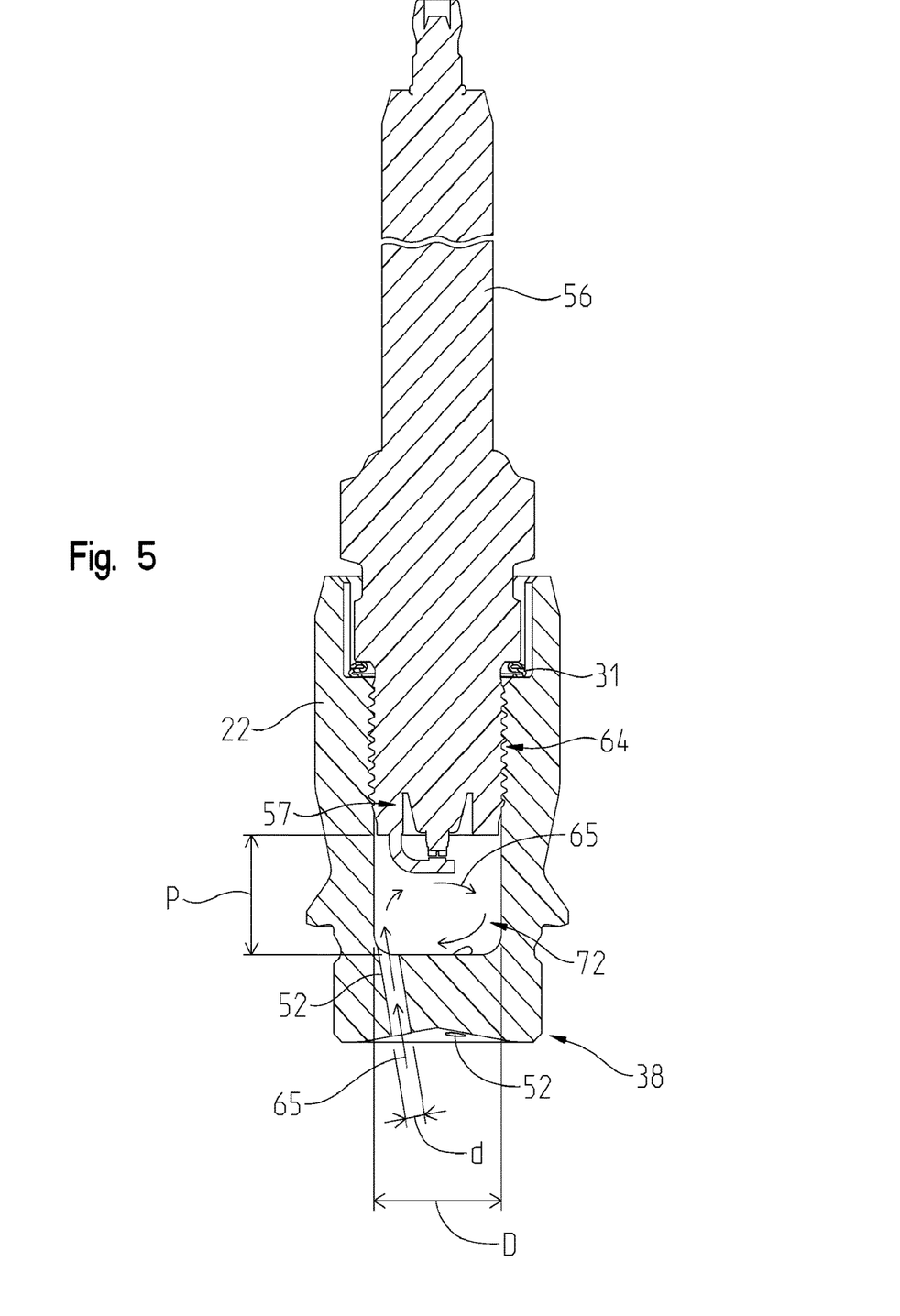
FIG. 5 is a cross-sectional view of the spark plug of FIG. 2 supported within the housing member of FIG. 4.

Illustratively, pre-chamber assembly 20 is a passive pre-chamber which includes a first housing member 22, a second housing member 24, a first seal 26, a second seal 28, a third seal 30, and a fourth seal 31 (FIGS. 2 and 5). Seal 26 may be a metallic combustion seal and fourth seal 31 may be a flexible spark plug gasket. Additional seals may be provided between pre-chamber 20 and cylinder head 6 and/or between pre-chamber 20 and cylinder 4. Referring to FIGS. 3, 6, and 7, first housing member 22 is positioned adjacent cooling passageway 18 and directly above cylinder 4. More particularly, a lower end 38 of first housing member 22 is generally flush with a lower end 40 of cylinder head 6 (FIG. 6) and may include threads (not shown) for coupling with cylinder head 6. Lower end 38 of first housing member 22 includes a plurality of nozzles 52 (FIGS. 4-7) which fluidly couple an internal volume 72 of first housing member 22 of pre-chamber assembly 20 to cylinder bore 5 of cylinder 4. In one embodiment, internal volume 72 of first housing member 22 has a generally cylindrical shape with a diameter D (FIGS. 4 and 5) of 10-20 mm, for example approximately 17.0 mm. Additionally, a length of the combustion volume within internal volume 72 of first housing member 22 is shown as length P (FIG. 5). Length P may be 10-20 mm and, more particularly, may be approximately 15.0 mm. In one embodiment, the ratio of length P of internal volume 72 to diameter D of internal volume 72 is 0.8-2.5. For example, the ratio of length P to diameter D may be 0.5-1.0.

Illustratively, first housing member 22 includes three nozzles 52 which may be spaced approximately 120° apart from each other. Each nozzle 52 may have a diameter d (FIGS. 4 and 5) and a summation of diameter d for each nozzle 52 defines an equivalent diameter of first housing member 22. More particularly, when diameters d for each nozzle 52 are added together to define equivalent diameter, the equivalent diameter may be approximately 1.0-5.0 mm and, in one embodiment, the equivalent diameter may be 2.5 mm. In one embodiment, the ratio of diameter D of internal volume 72 of first housing member 22 to the equivalent diameter of nozzles 52 is 2.0-10.0. For example, the ratio of diameter D to the equivalent diameter may be 3.0-6.0 and, more particularly, 3.4-5.0. It is to be appreciated that one of ordinary skill in the art, having the benefit of this disclosure, would select various ranges according to certain parameters and applications, such as size of the engine, quantity of fuel to be distributed, power output desired, operating parameters of the engine or fuel system, etc.

As shown in FIGS. 4-7, nozzles 52 are angled inwardly toward a center portion of lower end 38 of first housing member 22. For example, in one embodiment, nozzles 52 are angled approximately 5-15° from longitudinal axis L and, more particularly, approximately 10° from longitudinal axis L, as designated by a in FIG. 7. Illustrative nozzles 52 are angled toward each other such that the trajectory of each nozzle 52 is configured to converge at a single location 70 (FIG. 7). In this way, the output of each nozzle 52 converges at the same location 70, as disclosed further herein. It is to be appreciated that one of ordinary skill in the art, having the benefit of this disclosure, would select various ranges according to certain parameters and applications, such as size of the engine, quantity of fuel to be distributed, power output desired, operating parameters of the engine or fuel system, etc.

As shown in FIG. 6, an upper end 42 of first housing member 22 is received within a lower end of second housing member 24. Third seal 30 is positioned intermediate first housing member 22 and second housing member 24 such that upper end 42 of first housing member 22 is sealingly received within second housing member 24, as shown in FIG. 3.

Second housing member 24 is sealingly received within channel 36 of cylinder head 6 with second seal 28. Additionally, second housing member 24 may be coupled to cylinder head 6 with retaining member 32 and coupler 34. Alternatively, retaining member 32 may be configured to retain another component of the internal combustion engine on cylinder head 6 (e.g., a fuel injector, spark plug, or any other component configured to be supported on or within cylinder head 6). Retaining member 32 includes a tab 44 with an opening 46 which aligns with an opening 48 in cylinder head 6 to receive a coupler 34. Retaining member 32 also includes a semi-circular receiving surface 50 for receiving a portion of second housing member 24 or another component of the internal combustion engine.

Second housing member 24 has a cylindrical channel 54. An ignition device, illustratively a spark plug 56, is positioned within channel 54 and extends into internal volume 72 of first housing member 22. As such, spark plug 56 extends between first and second housing members 22, 24. More particularly, spark plug 56 is sealingly coupled against an inner surface of first housing member 22 with fourth seal 31 but is spaced apart from an inner surface of second housing member 24. Spark plug 56 also may include threads for threadedly coupling with a threaded portion 64 of first housing member 22, as shown in FIG. 5.

During operation of the internal combustion engine, fuel and/or air is supplied to cylinder bore 5 and/or pre-chamber assembly 20 for combustion. In one embodiment, fuel and air may be separately provided directly to cylinder bore 5 and/or pre-chamber assembly 20. Alternatively, fuel and air may be mixed to form a fuel/air mixture, or "charge", when introduced into cylinder bore 5 and/or pre-chamber assembly 20.

In the illustrative embodiment of cylinder assembly 2, combustion is initiated in pre-chamber assembly 20, rather than in cylinder bore 5. More particularly, fuel and/or air may be initially introduced into cylinder bore 5. However, when piston 8 moves from BDC to TDC during the compression stroke of the combustion cycle, the fuel and/or air from cylinder bore 5 is pumped into pre-chamber assembly 20, as designated by inlet jets 65 in FIG. 5, because the pressure is lower in pre-chamber assembly 20 than in cylinder bore 5 at this point during the combustion cycle. In one embodiment, the velocity of inlet jets 65 may be 20-110 m/s and, more particularly, may be 30-70 m/s. The incoming fuel and/or air from cylinder bore 5 is then mixed with any residual fuel and/or air already present in pre-chamber assembly 20, for example, from previous combustion cycles.

The fuel and air mix within pre-chamber assembly 20 to form a homogenous charge therein. Because the charge within pre-chamber assembly 20 is homogeneously mixed, the lambda and velocity of the charge within pre-chamber assembly 20 is consistent during each combustion cycle. The lambda of a charge relates to the air/fuel ratio relative to a stoichiometric air/fuel ratio. For example, when lambda is greater than 1.0, a lean charge is present during the combustion cycle. Conversely, when lambda is less than 1.0, a rich charge is present during the combustion cycle. In one embodiment, the lambda of the charge present within pre-chamber assembly 20 and/or cylinder bore 5 is 1.7-2.0, thereby indicating that cylinder assembly 2 operates with a lean charge during a combustion cycle.

When the charge from cylinder bore 5 enters pre-chamber assembly 20 through nozzles 52, electrodes 57 of spark plug 56 (FIG. 5) ignite the charge such that combustion initiates in pre-chamber assembly 20. By initiating combustion within pre-chamber assembly 20, the initial flame kernel formed when spark plug 56 ignites the charge within pre-chamber assembly 20 grows consistently and rapidly because the flow of the charge within pre-chamber assembly 20 is less turbulent than that of cylinder bore 5.

Referring to FIG. 6, the flame kernel formed during combustion within pre-chamber assembly 20 is expelled from pre-chamber assembly 20 through nozzles 52 to form outlet jets 62. More particularly, outlet jets 62 are directed into cylinder bore 5 through nozzles 52 of first housing member 22. As such, combustion occurs on cylinder bore 5 when outlet jets 62 ignite the charge present within cylinder bore 5.

As shown in FIG. 5, because nozzles 52 are angled towards each other, outlet jets 62 converge at a single location 70 within cylinder bore 5 and, more particularly, at location 70 within piston bowl 58. Illustratively, nozzles 52 are angled toward a longitudinal center portion of piston bowl 58 and longitudinally below squish region 60 such that convergence of outlet jets 62 at location 70 occurs within piston bowl 58. In one embodiment, location 70 is at approximately the longitudinal center of piston bowl 58 but is offset from a radial center of piston bowl 58, as shown in FIG. 6. However, outlet jets 62 may be directed to any single location within piston bowl 58, depending on the angle and parameters of nozzles 52.

The convergence of outlet jets 62 forms an intense high-energy ignition source for igniting the charge within cylinder bore 5 for combustion therein. For example, at a predetermined time during the combustion cycle, outlet jets 62 are configured to converge at location 70 for complete combustion of the charge within cylinder bore 5. In one embodiment, the predetermined time for convergence of outlet jets 62 is based on a position of piston 8 within cylinder bore 5, a position of the crankshaft operably coupled to piston 8, a pressure within pre-chamber assembly 20, and/or a pressure within cylinder bore 5. By directing nozzles 52 towards location 70 at approximately the center portion of piston bowl 58, outlet jets 62 may be stretched by and entrained in a recirculating flow of air and/or fuel within piston bowl 58. More particularly, the recirculating flow of air and/or fuel is denoted by arrows 66 (FIG. 7) and is formed by a squish jet 74 emanating from squish region 60 as piston 8 rises from BDC to TDC. For example, when fuel and/or air is supplied to cylinder bore 5 during a combustion cycle, the air and/or fuel begins to flow within cylinder bore 5 as piston 8 moves from BDC to TDC. As piston 8 approaches TDC, the fraction of trapped charge in squish region 60 decreases, while the fraction of trapped charge in piston bowl 58 increases. This results in a radially inward flow of squish jets 74 from squish region 60 to piston bowl 58 which entrains the existing charge within piston bowl 58 resulting in a recirculating flow 66 and increased turbulence within the piston bowl 58. Therefore, the turbulence of the flow of air and/or fuel within cylinder bore 5 may be influenced by both the shape of piston 8 and squish region 60. Furthermore, it may be appreciated that, depending on various parameters of piston 8, cylinder bore 5, and the operation of the internal combustion engine, recirculating flow 66 may flow in the opposite direction from that shown in FIG. 7. By focusing outlet jets 62 toward area 70 in piston bowl 58, rather than at the perimeter of piston bowl 58, outlet jets 62 may be directly incorporated into recirculating flow 66, as shown in FIG. 7, which increases the completeness of combustion within cylinder bore 5 because outlet jets 62 cause combustion of all of the charge within piston bowl 58. Area 70 may be a single location or may be defined by multiple points within a grouped area. Illustratively, area 70 is located within a center portion of piston bowl 58.

During a combustion cycle, pre-chamber assembly 20 and spark plug 56 experience increased temperatures. However, as shown in FIGS. 3 and 6, pre-chamber assembly 20 is positioned within cooling passageway 18 of cylinder head 6. More particularly, first housing member 22 is positioned directly within the flow of cooling fluid through cooling passageway 18. As such, when cooling fluid (e.g., air or coolant) flows through cooling passageway 18, first and second housing members 22, 24 and spark plug 56 may be cooled. In this way, cooling passageway 18 allows for heat flow away from nozzles 52. Therefore, pre-chamber assembly 20 is cooled by the cooling fluid within cooling passageway 18 which decreases the likelihood of pre-ignition and detonation or "knock" during the combustion cycle. Additionally, because spark plug 56 also is cooled by the cooling fluid within cooling passageway 18, the life of spark plug 56 may be increased.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

What is claimed is:

1. A pre-chamber assembly of an internal combustion engine, comprising:
    a pre-chamber housing; and
    a plurality of nozzles extending through a portion of the pre-chamber housing, each of the plurality of nozzles being directed to a center portion of a combustion chamber of the internal combustion engine.

2. The pre-chamber assembly of claim 1, wherein an output from each nozzle is configured to converge at the center portion of the combustion chamber at a predetermined operation of the engine.

3. The pre-chamber assembly of claim 2, wherein the predetermined operation of the engine is selected from the group consisting of a position of a piston within the combustion chamber of the engine, a position of a crankshaft of the engine, a pressure in the pre-chamber housing, and a pressure in a main chamber of the engine.

4. The pre-chamber assembly of claim 1, wherein the pre-chamber assembly is a passive pre-chamber assembly.

5. The pre-chamber assembly of claim 1, wherein the pre-chamber assembly is a fuel-fed pre-chamber assembly.

6. The pre-chamber assembly of claim 1, wherein the pre-chamber assembly is a charge-fed pre-chamber assembly.

7. The pre-chamber assembly of claim 1, wherein the output from each nozzle converges toward a single location at the center portion of the combustion chamber.

8. The pre-chamber assembly of claim 7, wherein each nozzle is configured to receive a flow of charge from the combustion chamber, and a velocity of the flow of charge is less than 110 m/sec.

9. The pre-chamber assembly of claim 8, wherein the pre-chamber housing includes an internal volume, and a ratio of a length of the internal volume to a diameter of the pre-chamber housing is 0.5-1.0.

10. The pre-chamber assembly of claim 1, wherein the pre-chamber housing has a first diameter and each nozzle has a second diameter, and the ratio of the first diameter to the second diameter is 3.0-6.0.

11. The pre-chamber assembly of claim 10, wherein the ratio of the first diameter to the second diameter is 3.4-5.0.

12. An internal combustion engine, comprising:
    at least one cylinder including a main chamber and a pre-chamber;
    a plurality of nozzles fluidly coupling the pre-chamber and the main chamber, and each nozzle is angled toward a center portion of the pre-chamber; and
    a piston positioned in the main chamber and including a piston bowl facing the pre-chamber,
    wherein outputs from the plurality of nozzles are configured to converge within the piston bowl.

13. The internal combustion engine of claim 12, wherein the output from each nozzle is directed toward a center portion of the piston bowl.

14. The internal combustion engine of claim 12, further comprising an ignition device supported within the pre-chamber and configured to ignite a charge in the pre-chamber.

15. The internal combustion engine of claim 14, further comprising at least one coolant flow path, and at least one of the pre-chamber and the ignition device is positioned within the coolant flow path.

16. The internal combustion engine of claim 12, wherein the pre-chamber has a first diameter and each nozzle has a second diameter, and the ratio of the first diameter to the second diameter is 3.0-6.0.

17. The internal combustion engine of claim 16, wherein the ratio of the first diameter to the second diameter is 3.4-5.0.

18. The internal combustion engine of claim 12, wherein each nozzle has the same diameter.

19. A method of initiating combustion within an internal combustion engine, comprising:
    providing a main chamber extending along a longitudinal axis;
    providing a pre-chamber fluidly coupled to the main chamber through a plurality of nozzles;
    igniting a charge in the pre-chamber;
    focusing an output of the ignited charge from each nozzle toward one location within the main chamber; and
    converging the output of the ignited charge from each nozzle toward each other within the piston bowl.

20. The method of claim 19, further comprising providing a piston with a piston bowl within the main chamber, wherein focusing the output includes focusing the output of the ignited charge from each nozzle toward a center portion of the piston bowl.

21. The method of claim 20, further comprising flowing a second charge from the main chamber into the piston bowl, wherein focusing the output includes converging the output of the ignited charge from each nozzle within the piston bowl below the flow of the second charge.

\* \* \* \* \*